United States Patent
Zuzga et al.

(10) Patent No.: US 8,849,981 B2
(45) Date of Patent: Sep. 30, 2014

(54) RESPONSE TIME BENCHMARKING

(75) Inventors: Brian Zuzga, San Francisco, CA (US); Mark Jacob Addleman, San Francisco, CA (US); Ramesh Mani, Fremont, CA (US)

(73) Assignee: CA, Inc., Islandia, NY (US)

( * ) Notice: Subject to any disclaimer, the term of this patent is extended or adjusted under 35 U.S.C. 154(b) by 1936 days.

(21) Appl. No.: 11/566,684

(22) Filed: Dec. 4, 2006

(65) Prior Publication Data

US 2008/0133739 A1 Jun. 5, 2008

Related U.S. Application Data

(60) Provisional application No. 60/872,322, filed on Dec. 1, 2006.

(51) Int. Cl.

| G06F 15/173 | (2006.01) |
|---|---|
| H04L 29/08 | (2006.01) |
| G06F 11/34 | (2006.01) |
| H04L 29/06 | (2006.01) |
| H04L 12/26 | (2006.01) |

(52) U.S. Cl.
CPC ........ *G06F 11/3419* (2013.01); *G06F 2201/87* (2013.01); *H04L 43/12* (2013.01); *H04L 67/02* (2013.01); *H04L 43/0852* (2013.01); *G06F 11/3428* (2013.01); *G06F 2201/875* (2013.01); *G06F 11/3495* (2013.01); *H04L 69/28* (2013.01)
USPC ........................................................ 709/224

(58) Field of Classification Search
CPC .......... G06F 2201/875; G06F 2201/87; G06F 11/3495; G06F 11/3428; G06F 11/3419

USPC ........................................................ 709/224
See application file for complete search history.

(56) References Cited

U.S. PATENT DOCUMENTS

| 5,621,663 A | 4/1997 | Skagerling |
|---|---|---|
| 5,627,766 A | 5/1997 | Beaven |
| 5,655,081 A | 8/1997 | Bonnell et al. |
| 5,812,780 A | 9/1998 | Chen et al. |
| 5,898,873 A | 4/1999 | Lehr |
| 5,978,594 A | 11/1999 | Bonnell et al. |
| 6,061,725 A | 5/2000 | Schwaller et al. |
| 6,141,699 A | 10/2000 | Luzzi et al. |

(Continued)

OTHER PUBLICATIONS

Office Action dated Feb. 25, 2009 in U.S. Appl. No. 11/284,567.

(Continued)

*Primary Examiner* — Bryan Lee
(74) *Attorney, Agent, or Firm* — Vierra Magen Marcus LLP

(57) ABSTRACT

A benchmark response time is determined for a browser application request sent to a network server over a network. The response time is determined by performance monitoring code that is loaded into and monitors the browser application from the client. The performance monitoring code automatically sends a request to a network server; the request is not sent in response to user input. The network server receives the request, generates a response and provides the response to the browser application. The response includes a fixed amount of randomly generated data. The browser application receives and processes the response, but does not display the bytes or change the content displayed in the browser application as a result of the response. The browser application sends the times at which the browser application sends the request and the browser application completes processing the response data to the network server for further processing.

25 Claims, 14 Drawing Sheets

(56) References Cited

U.S. PATENT DOCUMENTS

| | | |
|---|---|---|
| 6,332,212 B1 | 12/2001 | Organ et al. |
| 6,397,359 B1 | 5/2002 | Chandra et al. |
| 6,408,335 B1 | 6/2002 | Schwaller et al. |
| 6,625,648 B1 | 9/2003 | Schwaller et al. |
| 6,763,380 B1 | 7/2004 | Mayton et al. |
| 6,976,093 B2 | 12/2005 | Lara et al. |
| 7,093,251 B2 | 8/2006 | Tsun et al. |
| 7,107,273 B2 | 9/2006 | Ohata et al. |
| 7,254,601 B2 * | 8/2007 | Baller et al. .................. 709/200 |
| 7,260,645 B2 | 8/2007 | Bays |
| 2002/0112050 A1 | 8/2002 | Ullmann et al. |
| 2002/0174174 A1 | 11/2002 | Ramraj et al. |
| 2002/0184363 A1 * | 12/2002 | Viavant et al. ................ 709/224 |
| 2004/0098480 A1 | 5/2004 | Sekizawa |
| 2004/0199633 A1 * | 10/2004 | Pearson ......................... 709/226 |
| 2005/0246524 A1 * | 11/2005 | Brownell et al. .............. 713/156 |
| 2006/0224727 A1 | 10/2006 | Kumakura et al. |
| 2008/0114875 A1 * | 5/2008 | Anastas et al. ................ 709/224 |

OTHER PUBLICATIONS

Response to Office Action filed Apr. 29, 2009 in U.S. Appl. No. 11/284,567.

* cited by examiner

RESPONSE TIME BENCHMARKING

CLAIM OF PRIORITY

This application claims the benefit of commonly co-pending assigned U.S. provisional patent application No. 60/872,322, filed Dec. 1, 2006, titled "Response Time Benchmarking".

BACKGROUND

As more services and information become available over the Internet, the number of users that access the Internet and use these services increases. These users have a variety of choices in selecting which web sites to use for services such as travel planning, online banking, news reporting, etc.

With the variety of services available, a user may have many choices of providers to use for a particular Internet service. Thus, a company providing a service over the Internet should do whatever possible to distinguish itself from its competitors and ensure that it is providing a positive user experience through its web service. To achieve this, some web service providers monitor the provided web service to determine any problems or delays in providing the service to users.

Previously, performance of a web service was monitored by adding a component between the client device and an application server. The component determines times between transmission events for the client device and application server. However, the interposed component introduces additional delays in the communication between the client device and the application server.

Another previous system for monitoring web service performance captures times associated with server-side events during communication with a client device. An application server of the server-side time capture system receives a content request from a client device. After receiving the request, the server generates a content response which includes page load notification code and sends the response to the client device. An Internet browser at the client loads the content in the response and executes the page load notification code. When the content loading is completed, the code sends a page load notification message to the application server. The application server then determines the response time for the web service as the difference between the time the content request was received and the time the page load notification message was received at the application server.

The server-side time capture system for monitoring a web service shall be discussed in more detail. The system includes a client device, an application server, an agent and a manager application. The client device includes an Internet browser (or browser application). The content request is initiated by the browser application on the client in response to receiving user input. The time at which the server receives the request from the client is stored by the server. The server then generates a content response for the request. The content response includes requested content, a response identifier and page load notification code. The server sends the generated response to the client device. The page load notification message sent after content has been loaded includes the response identifier and is in the form of an image content request. When the server receives the page load notification message, it captures the current time at the server. The server-side captured response times are then sent to an agent module. The agent module aggregates the response time information and forwards aggregated response time information to a manager application.

The application server generates the response using a servlet and servlet filters. A custom servlet filter is used to insert the page load notification code into the response. Bytecode generation is used to generate the custom servlet filter within an application. To generate the filter, an application management tool may instrument the application's object code (also called bytecode). An application uses probes to access information from the application. A probe builder instruments (e.g. modifies) the bytecode for the application to add probes and additional code to the application. By adding the probes, the application becomes a managed application. The probes may measure specific pieces of information about the application without changing the application's business logic. The probe builder also generates the agent module. The agent may be installed on the same machine as the managed application or a separate machine. More information about instrumenting byte code can be found in U.S. Pat. No. 6,260,187 "System For Modifying Object Oriented Code" by Lewis K. Cirne, and U.S. patent application Ser. No. 09/795,901, filed Feb. 28, 2001, entitled "Adding Functionality to Existing Code at Exits," having inventor Jeffrey Cobb, both of which are incorporated herein by reference in its entirety. In one embodiment, the technology described herein does not actually modify source code. Rather, the present invention modifies object code. The object code is modified conceptually in the same manner that source code modifications are made.

To configure the application server of the server-side time capture system to process requests, the application server is initialized. After the server is initialized, application servlet filters are loaded and instantiated into servlet containers. To load and instantiate the application servlet filters, an application server configuration file is accessed and loaded to determine the current servlet filters associated with the application servlet container. Once the current servlet filters are determined, additional servlet filters are added into the servlet filter chain. The custom servlet data is added to a configuration file entitled, "web.xml" of the application server. The custom servlet filter data is added such that custom servlet filter is the first to process a content request for a servlet and last to process an outgoing content response from a servlet. The application server configuration file with modified servlet chain data is stored as an object in the application server memory.

The application file on the application server is then initialized, and the stored application server configuration file is read. The configuration file is read by the servlet container in preparation for instantiating servlets and servlet filters. Individual servlet filter class files are then loaded and instantiated. The individual servlet filter class files include both custom servlet class files and pre-existing servlet class files. This creates a data structure of servlet filters which will be used to process incoming content requests. Next, request templates for a servlet and servlet filter chains are generated and cached. Templates consisting of a chain of processing servlet filters and servlets are generated for particular URLs.

When a content request is received by the configured application server, the server generates a content response. The content response is generated at the application server by a servlet and a chain of one or more servlet filters. Once the content request is received by the application server, the server generates a request object and a response object. The request and response objects are routed through the chain of servlet filters and then to the servlet. The servlet generates the response from the response object, and the response is routed through the servlet filters again before being sent to the requesting client device.

The servlet filter chain includes a custom servlet filter inserted by bytecode instrumentation. When the request is routed through the servlet filters to the servlet, custom servlet filter assigns a request identifier to the request. The request identifier is stored with the request as it is processed by the servlet and servlet filters. The request identification number and corresponding servlet identification information are stored in a servlet table. The custom servlet filter also wraps the response object in a wrapper. The response object wrapper detects whether a writing object or output stream is used to generate the body of the response and can provide that information to a requesting entity.

When processing the response generated by the servlet, the custom servlet filter adds JavaScript page load notification code to the response. When adding the page load notification code to the content response, the custom servlet filter confirms the response is in HTML and whether the response was written using an available writer or an output stream. The custom servlet determines if the response is in HTML by placing a call to a response object method for retrieving a Multi-Purpose Internet Mail Extension (MIME) type of the response object. The response from the get MIME type method indicates whether the MIME type is HTML or some other format. If the response is determined to be HTML, a Get Writer query is made to the response object wrapper. The page load notification code is then written to the response using either an output stream if used to generate the response, the writer used to generate the response, or an alternative writer that may be used to write to the response. If the response is not in HTML or there is no writer available to write code to the response which was generated with a writer, then the code is not inserted into the response by the custom servlet filter.

After writing the response, the response is sent to the client device. The client device receives the response and provides the response to the browser application. The page load notification code is then registered with the browser application and executed. When executed, the page load notification code registers a function with an On Load event handler at the browser application.

When an On Load handler already exists, the page load notification code places the function before the existing code in the On Load handler such that the added code is executed first. The function is JavaScript code that, when executed, sends a page load notification message to the application server. The page load notification message includes the request identification information assigned to the response by the custom servlet filter. The page load notification code is executed upon the detection of a browser application On Load event.

The page load notification message is in the form of an image source request message. Thus, the message requests image data from the application server. The message includes the request identification information in the name of the site request, such that the message is sent to: HTTP://(site)/ID=A, wherein A is the request identification information. The receiving application server "site" extracts the request identification information included in the site link and transmits a response to the image source request. The response is a transparent image having a 1×1 pixel array.

After the client device sends the page load notification message, the application server receives the message. The application server routes the received message to the appropriate processing servlet within the application server. The application server determines the appropriate servlet by retrieving the servlet identifier from the servlet identification table which is associated with the request identification information in the response. The processing servlet determines the time the page load notification message was received, determines the response time based on server side events, and sends an image content response to the browser application. The image content response includes a transparent 1×1 pixel matrix.

After processing the response, the servlet sends the time response to the agent application. The agent application then stores and aggregates the received time data. The aggregated time data is then sent to the manager application. The data may then be reported by the manager application to a workstation or database. The manager application receives performance data from managed applications via the Agent application, runs requested calculations, makes performance data available to workstations and optionally sends performance data to a database for later analysis. The workstations are the graphical user interface for viewing performance data. The workstations are used to create custom views of performance data which can be monitored by a human operator. The workstations consist of two main windows: a console and an explorer. The console displays performance data in a set of customizable views. The explorer depicts alerts and calculators that filter performance data so that the data can be viewed in a meaningful way.

The server-side time capture system is able to capture server-side information related to web service response time, but is not able to accurately determine the actual response time involved with a web service which provides content to a user at a client device. Rather, the server-side time capture system approximates the response time by recording times at the server that are associated with communications with the client device. Furthermore, the server-side time capture system used to determine response times (estimated from the server's point of view) for user-initiated requests to different URLs is an undesirable system for determining a benchmark response time for each URL. Accurate assessment of web service performance is important to evaluating the service provided to users.

SUMMARY

A benchmark response time is determined for a browser application request sent to a network server over a network. The response time is determined by performance monitoring code that is loaded into and monitors the browser application. The performance monitoring code automatically sends a request to a network server; the request is not sent in response to user input. The network server receives the request and provides a response to the browser application. The response to the automatically generated request includes a fixed amount of randomly generated data. The browser application receives and processes the response. Processing the response may include accessing and processing the randomly generated bytes, but does not include displaying the bytes or changing the display provided through the browser application. The times at which the browser application sends the request and the browser application completes processing of the random bytes are recorded and sent to the network server by the browser application.

A benchmark response time is determined by maintaining constants while generating and processing the benchmark request and response. The constants include a predetermined size of the bytes contained in the response, the randomly generated bytes of data which prevent access of the bytes from an application browser cache, and automatically sending the request when the browser application is idle or immediately after the response is received (and therefore unlikely to be used by a user). By maintaining these constants, a benchmark response time may be computed for a client at a particular browser application. The benchmark response time can then be compared to other response time data for other request-response pairs to help identify how a system is performing.

One embodiment may determine the performance of a server over a network. A request may automatically be sent to a first server by a client. A first time value associated with sending the request is recorded at the client. A response is then received from the first server. The response may include a first number of bytes of data. The data contained in the response is then processed by the client. A second time is recorded at the client after the client has processed the response. The first time and the second time are then reported by the client.

Another embodiment which determines the performance of a server over a network may automatically send a first request to a first server by a client. A first response is then received by the client from the first server. A second request may also be automatically sent to the first server by the client, and a second response is received from the first server by the client. The first response and the second response may contain the same number of bytes. Time information associated with each response may be automatically reported to a performance monitoring system.

Another embodiment may determine the performance of a server over a network. A network page is received by a browser application on a client. The network page may include a first set of code. The browser application sends a request to a first server in response to executing the first set of code. The time at which the request was sent to the server is then recorded. The browser application receives a response having a first number of bytes from the first server. The browser application processes the data contained in the response. Processing the response does not include changing content displayed to a user by the browser application. The time at which the browser application processed the response is recorded, and the recorded times are reported to a server by the client.

An embodiment determines the performance of a server by automatically initiating a request to a first server by a client and storing the time associated with the request. A response which includes a first number of bytes is then accessed from the first server. A client browser application then processes the data contained in the response. The time at which the client browser application has processed the response is then stored. The client then transmits the time associated with sending the request and processing the response.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

The present technology determines a benchmark response time for processing a browser request by a network server over a network. The response time data is generated by performance monitoring code that is loaded into a browser application. The performance monitoring code automatically sends a request to a network server. The request may be sent immediately upon loading the performance monitoring code, when the browser application is determined to be idle, or at some other time. The network server receives the request and provides a response to the browser application. The response to the automatically generated request includes a fixed amount of randomly generated data. The browser application receives and processes the response. The processing may include accessing and processing the randomly generated bytes, but does not include displaying the bytes or changing the display provided through the browser application. The times at which the browser application sends the request and the browser application completes processing of the random bytes are recorded and sent to the network server by the browser application.

A benchmark response time is established by keeping several aspects of the benchmark request and response constant between different browser applications. The constants include the predetermined size of the bytes contained in the response, the randomly generated bytes of the data which prevent access of the bytes from an application browser cache, and automatically sending the request when the browser application is idle, immediately after the response is received (and therefore unlikely to be used by a user) or at some other time at which the user is not requesting the browser application communicate over a network. By maintaining these constants, a benchmark response time may be computed for a client at a particular browser application. The benchmark response time can then be compared to other response time data for other request-response pairs to help identify how a system is performing.

The performance monitoring code may be provided to a browser application in a response sent by a network server to a browser application request. The performance monitoring code can be inserted into a response using byte code instrumentation, appending the HTML in a response to include code, a combination of these or in some other manner.

The response time data generated by the performance monitoring code at a browser application may be sent to a network server immediately after the data is generated or as part of another request that is independent of the data. The other request may a second automatically generated benchmark request, a user initiated content request, or some other request.

Figure 1:
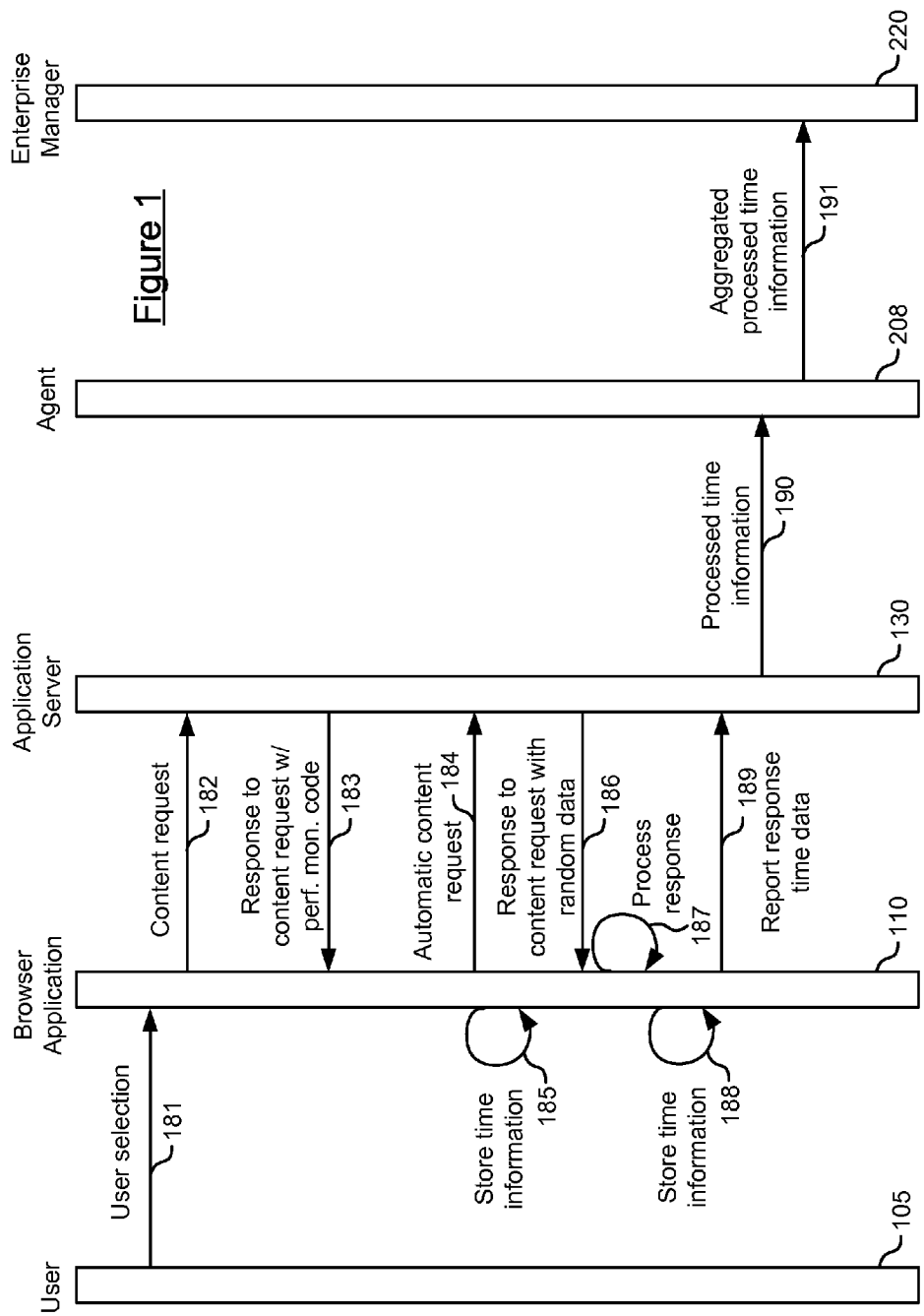
FIG. 1 illustrates an embodiment of a sequence diagram for the present technology.

FIG. 1 illustrates an embodiment of a sequence diagram for the present technology. The sequence diagram of FIG. 1 illustrates communications between user 105, browser application 110, application server 130, agent 208, and enterprise manager 220. User 105 may enter selections to browser application 110 which resides on a client computer. Browser application 110 may communicate with application server 130 over a network such as the Internet. In some embodiments, there may be intermediary machines or modules between the communication between browser application 110 and application server 130, such as a web server. Application server 130 may communicate with agent 208, which may be located on application server 130 or a different machine. Agent 208 may communicate with application server 130 and enterprise manger 220, which may be on the same machine or different machine as agent 208.

Browser application 110 receives a user selection from user 140 as communication 181. The user selection may be associated with a content page element associated with an anchor, a form or some other element. In one embodiment, the selected element is available from application server 130. After receiving the user selection, browser application 110 transmits a content request to application server 130 as communication 182. In one embodiment, the content request may be an HTTP request. Next, application server 130 receives and processes the content request and generates a content response. In one embodiment, performance monitoring code is included in the response generated as a result of the content request. The code may be implemented as JavaScript or some other type of code. The content response is transmitted to browser application 110 as communication 183.

Browser application 110 receives the content response and extracts the performance monitoring code and content data from the response. The performance monitoring code is registered with browser application 110 and executed. While executing the performance monitoring code, browser application 110 also loads the extracted content into a user interface. After the content is loaded, browser application 110 executes the performance monitoring code.

At some point after executing the performance monitoring code, browser application 110 automatically sends a benchmark request to application server 130 as communication 184. Then, the performance monitoring code stores timing information associated with the received user selection as communication 185. Application server receives the content request, generates a content response, and sends the content response to browser application 110 as communication 186. The response includes a fixed amount of data randomly generated by application server 130. Browser application 110 receives the content response and processes the response as communication 187. Browser application 110 does not change any content provided to a user during or as a result of processing the response. After processing the response, browser application 110 stores the browser time as communication 188. Browser application 110 then sends the response time data to application server 130 as communication 189. Application server 130 receives the response time data, processes the received data and sends the processed data to agent 208 as communication 190. Agent 208 then aggregates and transmits the aggregated processed response time data to enterprise manager 120 as communication 191. The representative communications of the sequence diagram of FIG. 1 are described in more detail with respect to FIGS. 5-11.

Figure 2A:
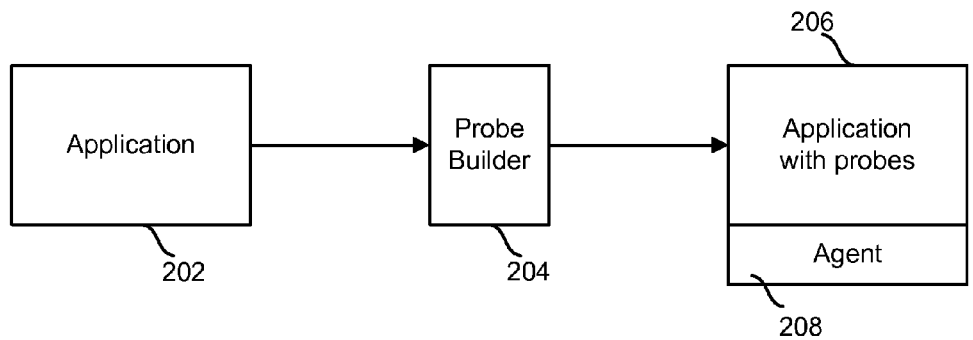
FIG. 2A is a block diagram describing how bytecode for an application is instrumented.

As discussed above, performance monitoring code may be inserted into a response generated by an application on an application server. The code may be inserted using bytecode instrumentation or some other method. In one embodiment, the technology herein can be used to generate a filter (such as servlet filter) within an application on an application server using bytecode instrumentation. The technology herein may also be used to access information from the particular application. To generate the filter, an application management tool may instrument the application's object code (also called bytecode). FIG. 2A depicts an exemplar process for modifying an application's bytecode. FIG. 2A shows Application 202, Probe Builder 204, Application 206 and Agent 208. Application 206 includes probes used to access information from the application, and application 202 is the application before the probes are added. Application 202 can be a Java application or a different type of application.

Probe Builder 204 instruments (e.g. modifies) the bytecode for Application 202 to add probes and additional code to Application 202 in order to create Application 206. The probes may measure specific pieces of information about the application without changing the application's business logic. Probe Builder 204 also generates Agent 208. Agent 208 may be installed on the same machine as Application 206, such as application server 130, or a separate machine. Once the probes have been installed in the application bytecode, the application is referred to as a managed application. More information about instrumenting byte code can be found in U.S. Pat. No. 6,260,187 "System For Modifying Object Oriented Code" by Lewis K. Cirne, incorporated herein by reference in its entirety.

In one embodiment, the technology described herein doesn't actually modify source code. Rather, the present technology modifies object code. The object code is modified conceptually in the same manner that source code modifications are made. More information about such object code modification can be found in U.S. patent application Ser. No. 09/795,901, "Adding Functionality To Existing Code At Exits," filed on Feb. 28, 2001, incorporated herein by reference in its entirety.

Figure 2B:
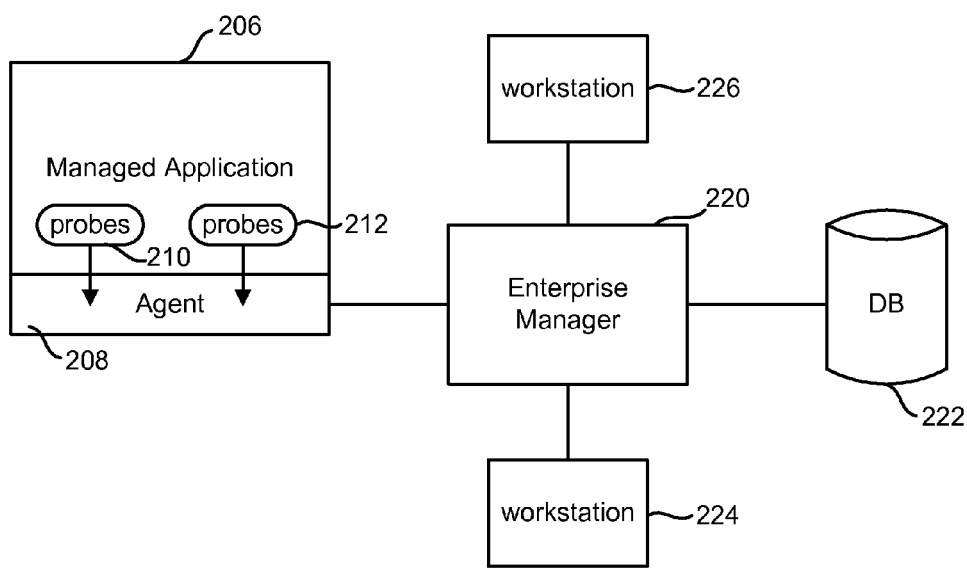
FIG. 2B is a block diagram of a system for monitoring an application.

FIG. 2B is a conceptual view of the components of the application performance management tool. In addition to managed Application 206 with probes 212 and 210, FIG. 2B also depicts Enterprise Manager 220, database 222, workstation 224 and workstation 226. As a managed application runs, probes (e.g. 212 and/or 210) relay data to Agent 208. In one embodiment, probes 212 and 210 may be implemented at least in part by one or more filters, such as a servlet filter. Servlet filters are discussed in more detail below. Agent 208 then collects and summarizes the data, and sends it to Enterprise Manager 220.

Enterprise Manager 220 receives performance data from managed applications via Agent 208, runs requested calculations, makes performance data available to workstations (e.g. 224 and 226) and optionally sends performance data to database 222 for later analysis. The workstations (e.g. 224 and 226) are the graphical user interface for viewing performance data. The workstations are used to create custom views of performance data which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment of the system of FIG. 2B, each of the components is running on different machines. That is, workstation 226 is on a first computing device, workstation 224 is on a second computing device, Enterprise Manager 220 is on a third computing device, and managed Application 206 is running on a fourth computing device. In another embodiment, two or more (or all) of the components are operating on the same computing device. For example, managed application 206 and Agent 208 may be on a first computing device, Enterprise Manager 220 on a second computing device and a workstation on a third computing device. Alternatively, all of the components of FIG. 2B can run on the same computing device. Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the managed application can include a web server/application server. The system running the managed application may also be part of a network, including a LAN, a WAN, the Internet, etc. In some embodiments, all or part of the technology is implemented in software that is stored on one or more processor readable storage devices and is used to program one or more processors.

Figure 2C:
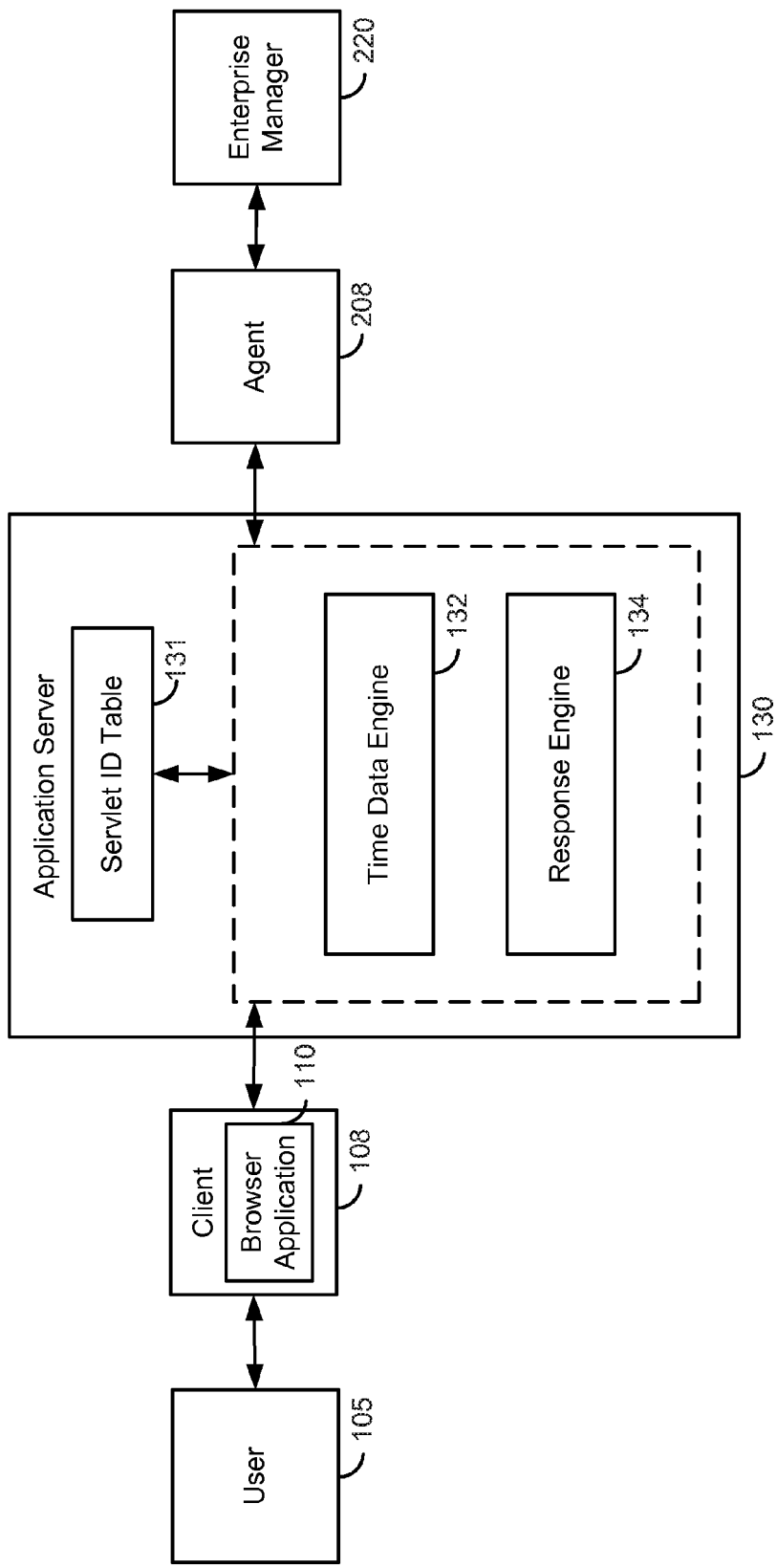
FIG. 2C illustrates an embodiment of a system for implementing the present technology.

FIG. 2C illustrates an embodiment of a system 128 that can provide the response time and other timing information discussed above. System 128 includes user 105, client 108, application server 130, agent 208, and enterprise manager 220. Client 108, which includes browser application 110, receives input from user 105. Application server 130 may include servlet identification table 131, time data engine (TDPE) 132, and response engine (RGE) 134. Application server 130 may communicate with client device 105 through a network, such as the Internet. Agent 208 may communicate with application server 130 and enterprise manager 220 via a LAN or other suitable means.

Browser application 110 resides in memory of client device 105. User 105 may provide input through a user interface provided by browser application 110. The browser may provide content, such as web page content, from data received from application server 130.

Application server 130 provides a web service accessible by browser application 110 on client device 105. Servlet identification table 131 comprises servlet identification information and corresponding unique identifiers for requests received by application server 130. The table information is used to store information regarding which servlet generated a particular content response. Time data engine 132 determines time information from events detected by application server 130 and data received from client device 105. Response engine 134 may generate a response to a content request received from the client. Determination of time information and generation of a response are discussed in more detail below.

Agent 208 receives time data, such as processed response time data, from application server 130. The time data is sorted, aggregated and provided to enterprise manager 220 by agent 208. Enterprise manager 220 receives aggregated data from agent 208. The data is then provided to a system administrator, backend user, database 222, or other entity. The administrator, backend user, or other entity may analyze the data to determine strengths and weaknesses in the benchmark response time between client device 105 and application server 130. For example, the data may be used to determine if the service network is performing slower than expected, to compare response times of other transactions, and for other performance calculations.

Figure 2D:
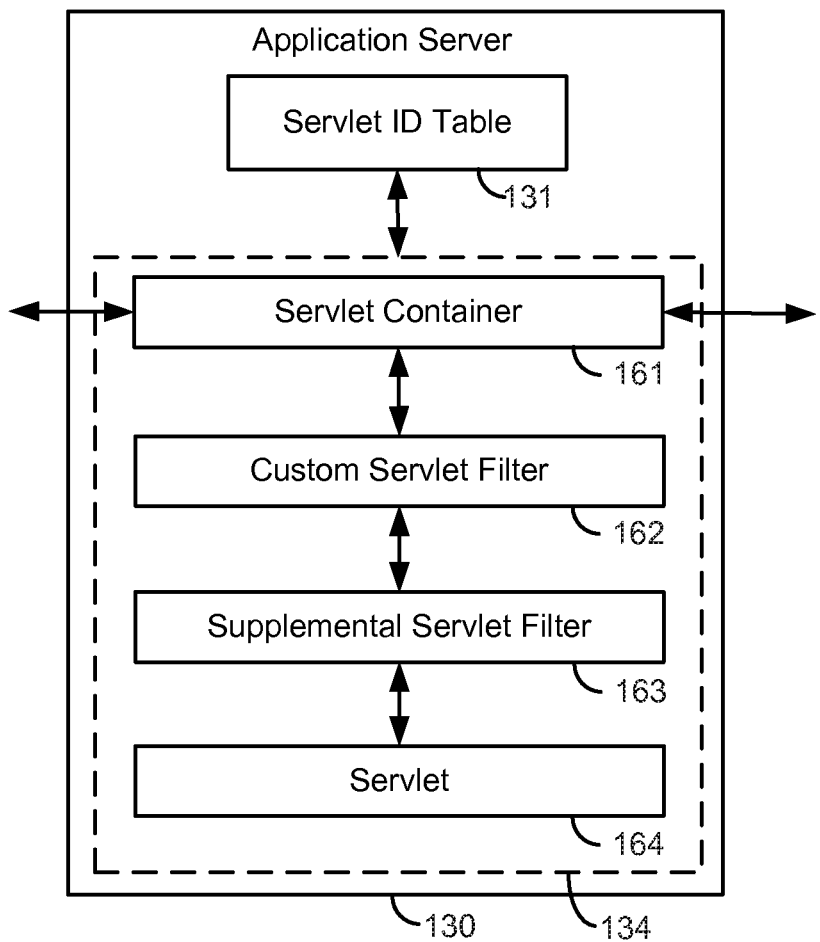
FIG. 2D illustrates an embodiment of an application server.

FIG. 2D illustrates an embodiment of application server 130 of FIG. 2C. Application server 130 includes server identification table 131 and response engine 134 (time data engine 132 not shown for purposes of simplification only). Response engine 134 includes servlet container 161, custom servlet filter 162, supplemental servlet filter 163, and servlet 164.

Servlet container 161 is a servlet engine able to provide servlet functionality. Servlet container 161 manages servlets, such as servlet 164, and determines which servlet to invoke for an incoming request. For example, servlet container 161 may receive a request and route the request to servlet 164. Operation of servlet container 161 is discussed in more detail below.

One or more custom servlet filters, such as custom servlet filter 162, may be implemented in response engine 134. Custom servlet filter 162 can intercept and process a request and/or response sent to or from servlet 164. In particular, custom servlet filter 162 may transform the header and body data in a content request or response. The code comprising custom servlet filter 162 can transform the body and header information of a request or response. In some cases, a custom servlet filter can be added to a servlet container by modifying an application configuration file. Initialization, instantiation, and operation of custom servlet filter 162 are discussed in more detail below.

One or more servlet filters, such as servlet filter 163, may be implemented in response engine 134. Supplemental servlet filter 163 is a servlet filter similar to custom servlet filter 162. However, supplemental servlet filter 163 is typically already configured and installed on application server 130. Thus, data need not be separately added to a configuration file to initialize a supplemental servlet filter.

One or more servlets, such as servlet 164, may be implemented in response engine 134. In one embodiment, a servlet is a component that generates dynamic content. Servlet 164 is an example of a component that generates a response associated with a content request. In one embodiment, servlet 164 can be a Java technology based web component. In another embodiment, servlet 164 may be implemented in some other technology. Operation of a servlet is discussed in more detail below.

Figure 3:
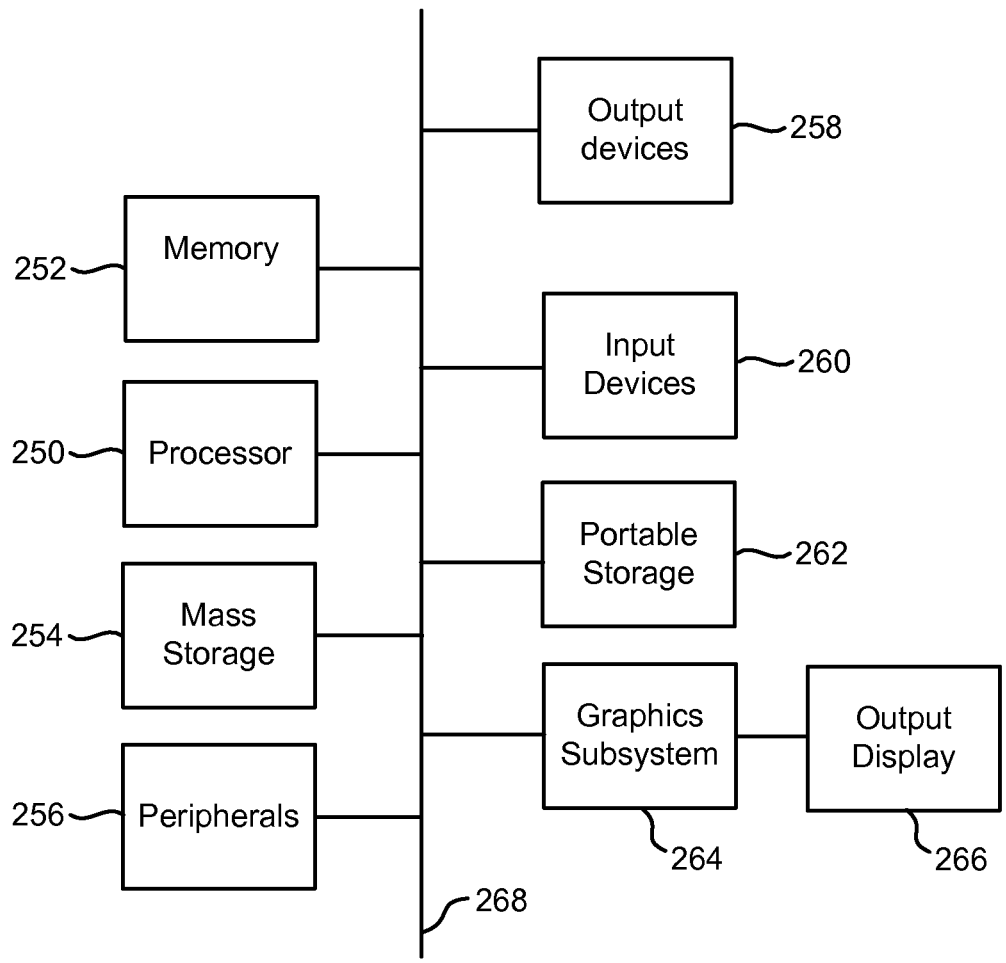
FIG. 3 illustrates a computing system in which the system of the present technology may be implemented.

FIG. 3 illustrates an embodiment of a computing system 200. In one embodiment, system 200 may be used to implement application server 130, client device 105, work station 224-226, database 222 and machines which contain agent 208 and/or enterprise manager 220.

The computer system of FIG. 3 includes one or more processors 250 and main memory 252. Main memory 252 stores, in part, instructions and data for execution by processor unit 250. If the system of the present technology is wholly or partially implemented in software, main memory 252 can store the executable code when in operation. The system of FIG. 3 further includes a mass storage device 254, peripheral device(s) 256, user input device(s) 260, output devices 258, portable storage medium drive(s) 262, a graphics subsystem 264 and an output display 266. For purposes of simplicity, the components shown in FIG. 3 are depicted as being connected via a single bus 268. However, the components may be connected through one or more data transport means. For example, processor unit 250 and main memory 252 may be connected via a local microprocessor bus, and the mass storage device 254, peripheral device(s) 256, portable storage medium drive(s) 262, and graphics subsystem 64 may be connected via one or more input/output (I/O) buses. Mass storage device 254, which may be implemented with a magnetic disk drive or an optical disk drive, is a non-volatile storage device for storing data and instructions for use by processor unit 250. In one embodiment, mass storage device 254 stores the system software for implementing the present technology for purposes of loading to main memory 252.

Portable storage medium drive 262 operates in conjunction with a portable non-volatile storage medium, such as a floppy disk, to input and output data and code to and from the computer system of FIG. 3. In one embodiment, the system software for implementing the present technology is stored on such a portable medium, and is input to the computer system via the portable storage medium drive 262. Peripheral device(s) 256 may include any type of computer support device, such as an input/output (I/O) interface, to add additional functionality to the computer system. For example, peripheral device(s) 256 may include a network interface for connecting the computer system to a network, a modem, a router, etc.

User input device(s) 260 provides a portion of a user interface. User input device(s) 260 may include an alpha-numeric keypad for inputting alpha-numeric and other information, or a pointing device, such as a mouse, a trackball, stylus, or cursor direction keys. In order to display textual and graphical information, the computer system of FIG. 3 includes graphics subsystem 264 and output display 266. Output display 266 may include a cathode ray tube (CRT) display, liquid crystal display (LCD) or other suitable display device. Graphics subsystem 264 receives textual and graphical information, and processes the information for output to display 266. Additionally, the system of FIG. 3 includes output devices 258. Examples of suitable output devices include speakers, printers, network interfaces, monitors, etc.

The components contained in the computer system of FIG. 3 are those typically found in computer systems suitable for use with the present technology, and are intended to represent a broad category of such computer components that are well known in the art. Thus, the computer system of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 4A:
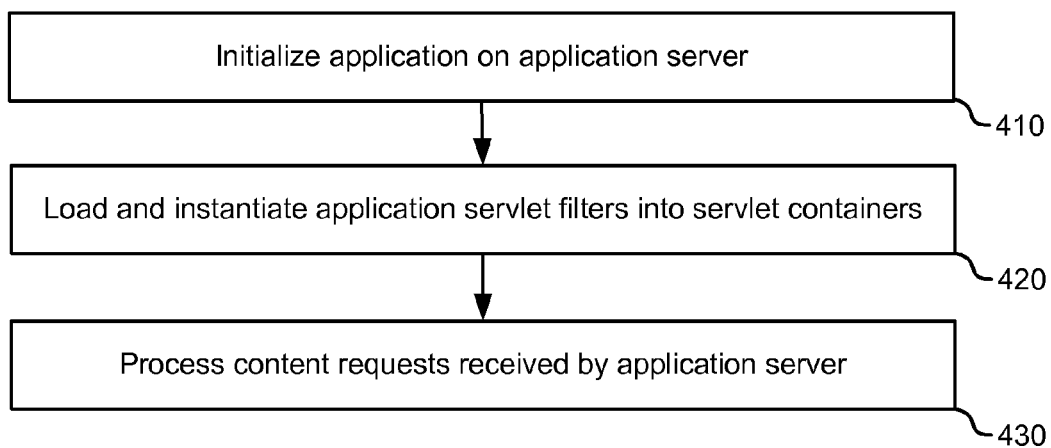
FIG. 4A illustrates a flowchart of an embodiment of a process for configuring an application server to process content requests.

FIG. 4A illustrates a flow chart of an embodiment of a method for configuring application server 130 to process content requests. An application on application server 130 is initialized at step 410. Application servlet filters are loaded and instantiated into servlet containers at step 420. Custom servlet filter 162 is included in the servlet filters to be loaded and instantiated. In one embodiment, custom servlet filter 162 can be added to a configuration file in order for the filter to be loaded and instantiated with the other servlet filters. The loading and instantiating is performed by servlet container 161. Step 420 is discussed in more detail with respect to FIG. 4B below. Next, content requests received by an application are processed at step 430.

Figure 4B:
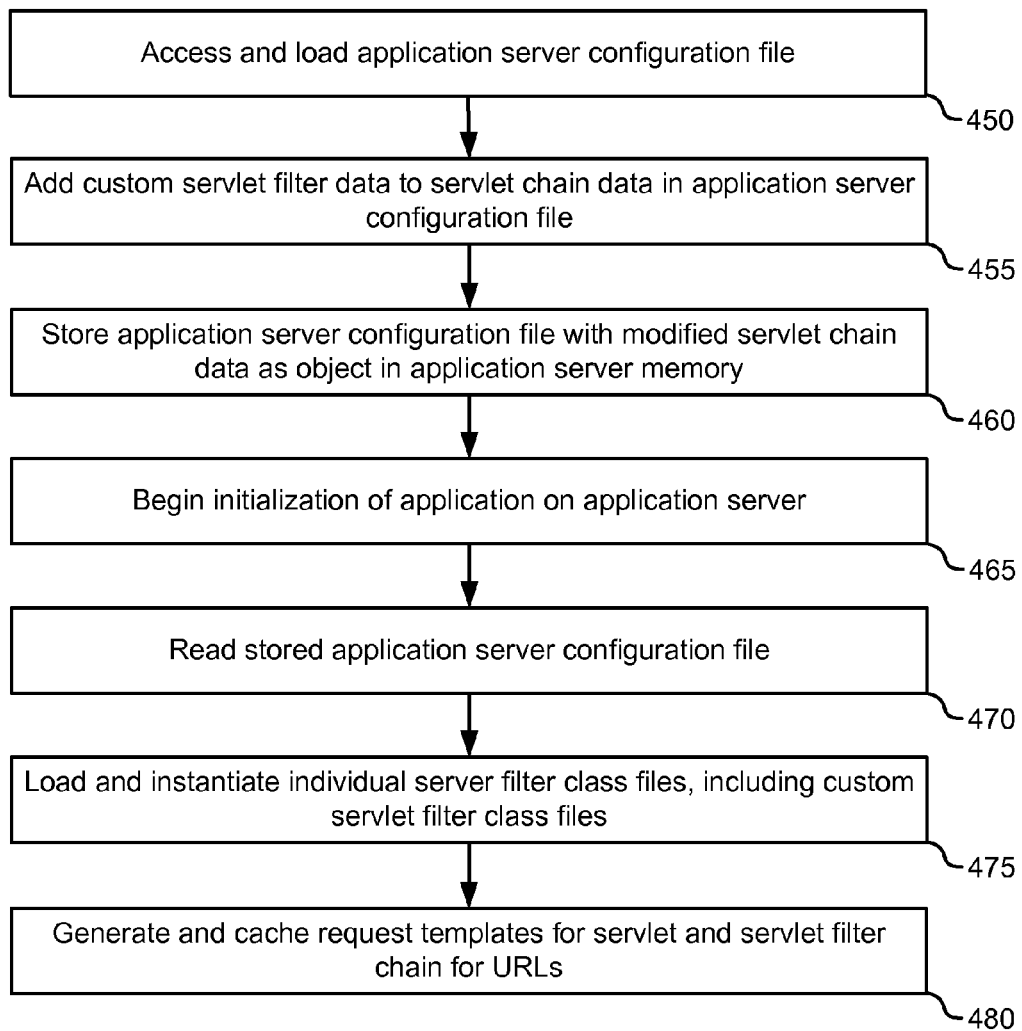
FIG. 4B illustrates a flowchart of an embodiment of a process for loading and instantiating application servlet filters.

FIG. 4B illustrates a flow chart of an embodiment of a method for loading and instantiating application servlet filters. The method of FIG. 4B provides more detail for step 420 of the method of FIG. 4A. An application server configuration file is accessed and loaded at step 450. In one embodiment, the configuration file is accessed to determine the current servlet filters associated with the application servlet container. Once the current servlet filters are determined, additional servlet filters can be added into the servlet filter chain. Custom servlet filter data is added to servlet filter chain data in the application server configuration file at step 455. In one embodiment, the custom servlet data is added to a configuration file entitled, "web.xml" of the application server. The added data is used to subsequently load and instantiate custom servlet filters. The custom servlet filter data has the same format as existing servlet filters. For example, the custom servlet filter data includes header information and body information. In one embodiment, the custom servlet filter data is added such that custom servlet filter 162 is the first to process a content request for a servlet and last to process an outgoing content response from a servlet. This is illustrated in FIG. 2D by custom servlet filter 162. Once information for additional servlet filters is added, an application server will interpret the custom servlet filter data as a normal servlet filter data within the application server configuration file.

The application server configuration file with modified servlet chain data is stored as an object in the application server memory at step 460. The modified configuration file replaces the original application server configuration file accessed at step 450.

Initialization of the application on the application server is performed by servlet container 161 at step 465. In one embodiment, step 465 is performed at startup of the application server or the servlet engine of the servlet container. Next, the stored application server configuration file is read at step 470. The configuration file may be read by servlet container 161 in preparation for instantiating servlets and servlet filters. Individual servlet filter class files are then loaded and instantiated at step 475. The individual servlet filter class files may include both custom servlet class files (for example, class files for custom servlet filter 162) and pre-existing servlet class files (such as class files for supplemental servlet filter 163). This creates a data structure of servlet filters which will be used to process incoming content requests. Next, request templates for a servlet and servlet filter chains are generated and cached at step 480. Templates consisting of a chain of processing servlet filters and servlets are generated for particular URLs. For example, a different chain of servlet filters and servlets may be used to process requests from different URLs. Each request template may specify a chain for one or more URLs.

In one embodiment, the method of FIG. 4B may be performed for application servers within a WebLogic application server architecture. WebLogic is provided by BEA Systems, of San Jose, Calif. In another embodiment, the method of FIG. 4B may be performed for application servers implemented within a WebSphere application server architecture. WebSphere is provided by IBM, of San Jose, Calif. For WebSphere application servers, the method of FIG. 4B can be altered slightly because a servlet filter chain is maintained outside a server configuration file. In this case, the servlet filter chain is modified rather than an application server configuration file. Otherwise, the method of FIG. 4B is generally applicable to both application server architecture systems, as well as other systems.

Figure 5:
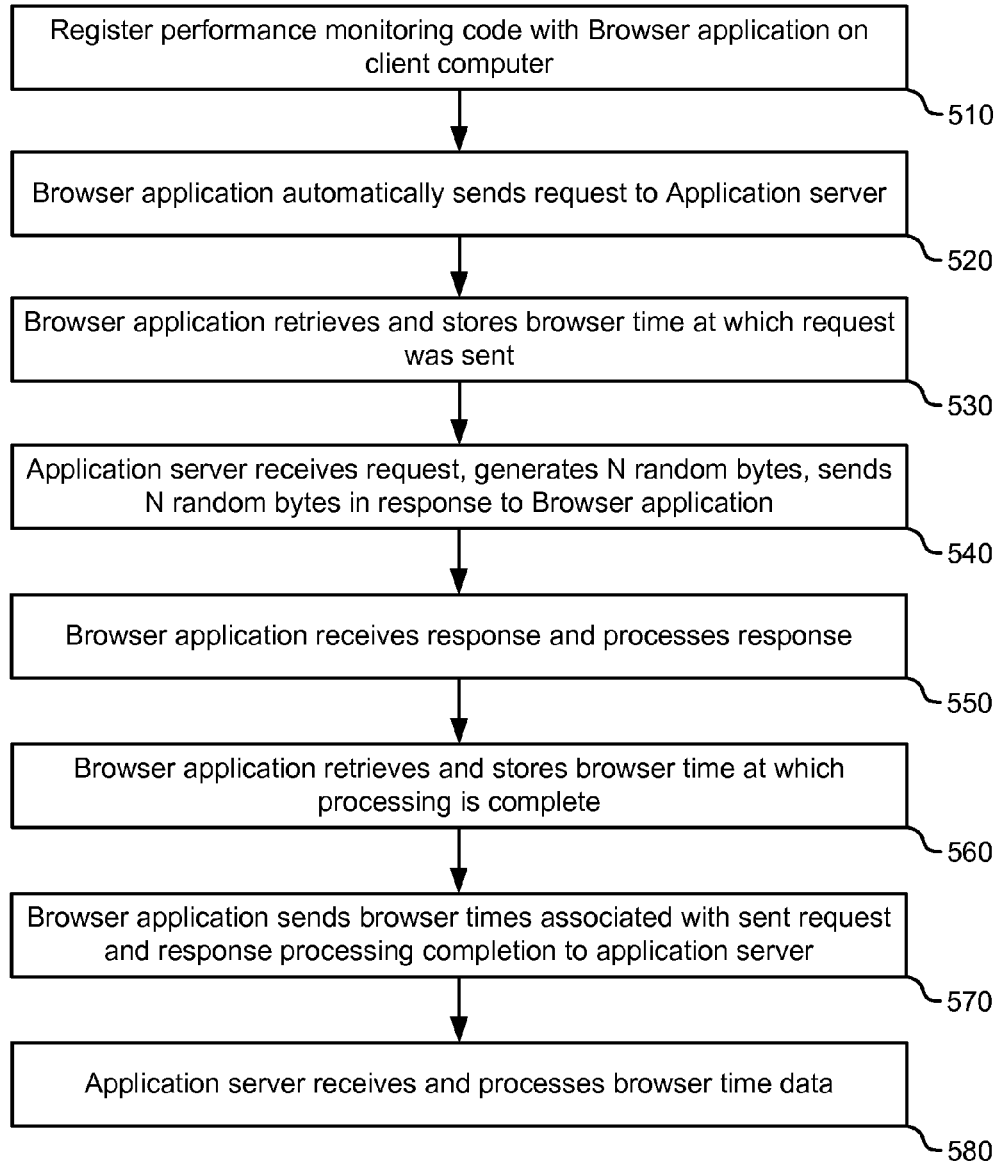
FIG. 5 illustrates a flowchart of an embodiment of a process for determining a benchmark response time over a network.

The representative communications of the sequence diagram of FIG. 1 are now discussed in more detail with respect to FIGS. 5-11. FIG. 5 illustrates a flow chart of an embodiment of a process for determining a benchmark response time over a network. First, performance monitoring code is registered with a browser application on a client computer at step 510. Performance monitoring code is loaded by the browser application from a response received from application server 130. In one embodiment, the performance monitoring code is contained in code comprising a network page (for example, HTML of a web page) received from application server 130. Registering performance monitoring code with a network browser is described in more detail with respect to FIG. 6.

Browser application 110 automatically sends a request to application server 130 at step 520. In some embodiment, the request is sent when browser application 110 is determined to be idle or immediate after the performance monitoring code is loaded. The request may be sent to a server or other machine over a network and/or connection to the benchmark. Automatically sending a request to application server 130 when browser application 110 is idle is discussed in more detail with respect to FIG. 9.

Browser application 110 retrieves and stores the browser time at which the request was automatically sent at step 530. In some embodiments, performance monitoring code registered with the browser retrieves the time from browser application 110 and stores the time at the client. The time may be stored in a file, such as a cookie file, or some other file on the client.

Application server 130 receives the request, generates N random bytes and sends the N random bytes in response to browser application 130 at step 540. In some embodiments, the number of bytes sent may be configurable. For example, the number of bytes may be selected such that the response generated by the application server resembles the size of an actual response but does not provide an unnecessary load on the application server. The N bytes may be 20 bytes, 200 bytes, 500 bytes, or some other number of bytes. The bytes are randomly generated to ensure that browser application 110 does not have the bytes available in a browser cache and may thereby process the bytes more quickly (by accessing them from cache rather than from the response itself). In some embodiments, application server 130 may perform some additional processing for each response time benchmark request it receives. The additional processing may be one or more operations that are performed to generate the random data or some other representative processing meant to simulate the work done by application server 130 and/or an application thereon when processing a non-benchmark response time related request. This is optional and the particular processing performed may be configured by an administrator.

Browser application 110 receives the response and processes the response at step 550. The response received includes the N random bytes generated by application server 130. Processing the response includes accessing and processing the N random bytes. In some embodiments, browser application 110 will not change a network page in response to receiving or processing the benchmark response. Thus, the request and response occur as "invisible" to a user at browser application 110. Receiving the response and processing the response by browser application 110 is discussed in more detail below with respect to FIG. 10.

Browser application 110 retrieves and stores a browser time at which the processing of the random bytes is complete at step 560. Storing the browser time at step 560 is similar to storing the browser time at step 530, but is performed in response to a different event. The browser time at which the processing is complete may be stored by browser application 110 in the same file as the browser time stored at step 530, in a different file, or not stored at all. In some embodiments, the browser time retrieved at step 560 may be stored in a browser cache rather than a client file. Next, browser application 110 sends the browser times associated with the sent request and response processing as response time data to application server 130 at step 570. Browser application 110 may access both times from cookie files, cache memory or wherever else they are contained. In some embodiments, browser application 110 may delete a cookie file or other file containing the response time data after the browser times are sent.

The response time data may be sent in several ways. In one embodiment, the response time data may be sent immediately after the data is generated. In this case, the response time data may be sent as part of the URL address to application server 130. In particular, the response time data may be in the form of an image source request message. Thus, the message requests image data from the application server. The message includes the request identification information in the name of the site request, such that the message is sent to: HTTP:// (site)/ID=A, wherein A is the response time data. The receiving application server "site" extracts the request identification information included in the site link and transmits a response to the image source request. The response is a transparent image having a 1×1 pixel array.

In some embodiments, the response time data may be sent to application server 130 as part of the next automatic benchmark request. Thus, if steps 520-580 of FIG. 5 are repeated to automatically send multiple benchmark requests, browser application 110 could send the response time data as discussed with respect to step 570 in a repeat occurrence of the request discussed with respect to step 520. In some embodiments, the response time data may be sent as part of a subsequent user initiated request. Thus, the response time data sent as described at step 570 could be sent with a request initiated by user input as described at step 620 of the method of FIG. 6. In some embodiments, the response time data may be sent at the earliest occurrence of either an automatic benchmark request or a user request.

Next, application server 130 receives and processes the response time data at step 580. Application server 130 may receive the response time data and provide the data to Agent 208. Agent 208 may aggregate the response time data and then transmit the data to Enterprise Manager 220. Processing the response time data at application server 130 is discussed in more detail below with respect to FIG. 11.

Figure 6:
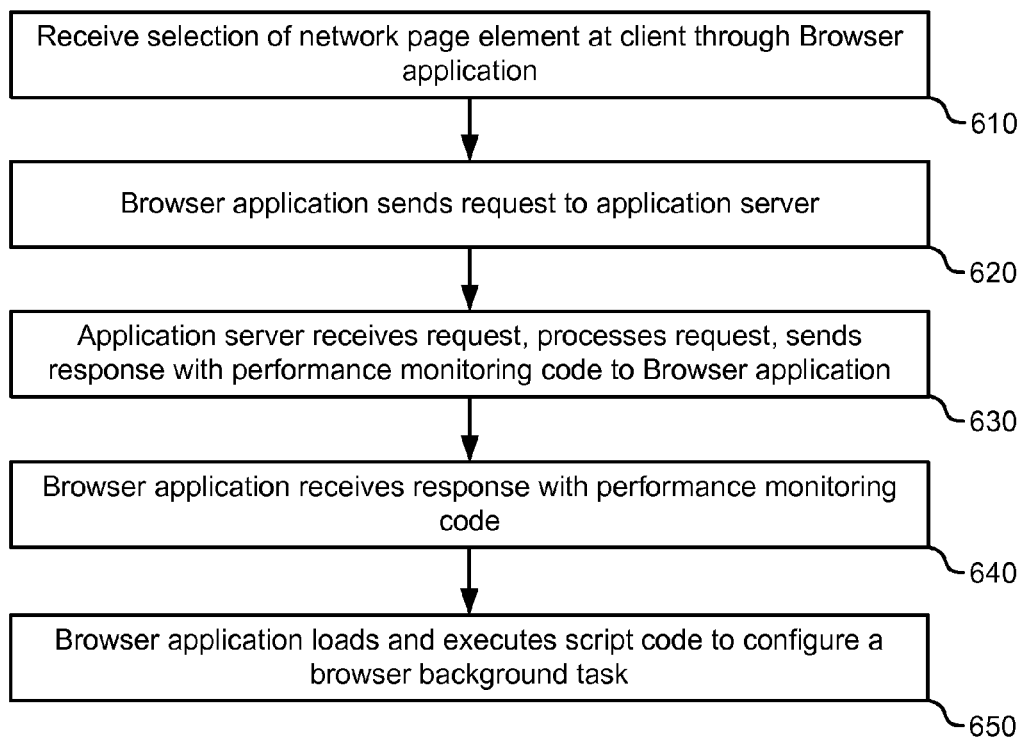
FIG. 6 illustrates a flowchart of an embodiment of a process for registering performance monitoring code with a browser application.

FIG. 6 illustrates a flow chart of an embodiment process for registering performance monitoring code with a browser application. In some embodiments, the process of FIG. 6 provides more detail for step 510 of FIG. 5. First, a selection of a network page element is received at a client through a browser application 110 at step 610. In some embodiments, user selection may be a selection of a web page button, entering text into a text box, or some other selection associated with a web page anchor or form. Next, browser application 110 sends a request to application server 130 at step 620. The request is sent in response to receiving the selection at step 610. In some embodiments, the request is an HTTP request for content from application server 130 by browser application 110.

Application server 130 receives the request, processes the request and sends a response to browser application 110 at step 630. The response includes performance monitoring code inserted into the response by application server 130. Receiving, processing and sending the response with performance monitoring code to browser application 110 by application server 130 is discussed in more detail below with respect to FIG. 7. Browser application 110 receives the response with performance monitoring code at step 640. Browser application 110 then loads and executes the performance monitoring code to configure a browser background task at step 650. A background task is a process that occurs in the background of an application, such as a browser application, that returns control to a user or other process as soon as the task is started. The task may trigger events similar to other code in a browser application. In some embodiments, the performance monitoring code is script code. The executed performance monitoring script code may perform steps 520-530 and 550-570 of the process at FIG. 5 as one or more background tasks.

Figure 7:
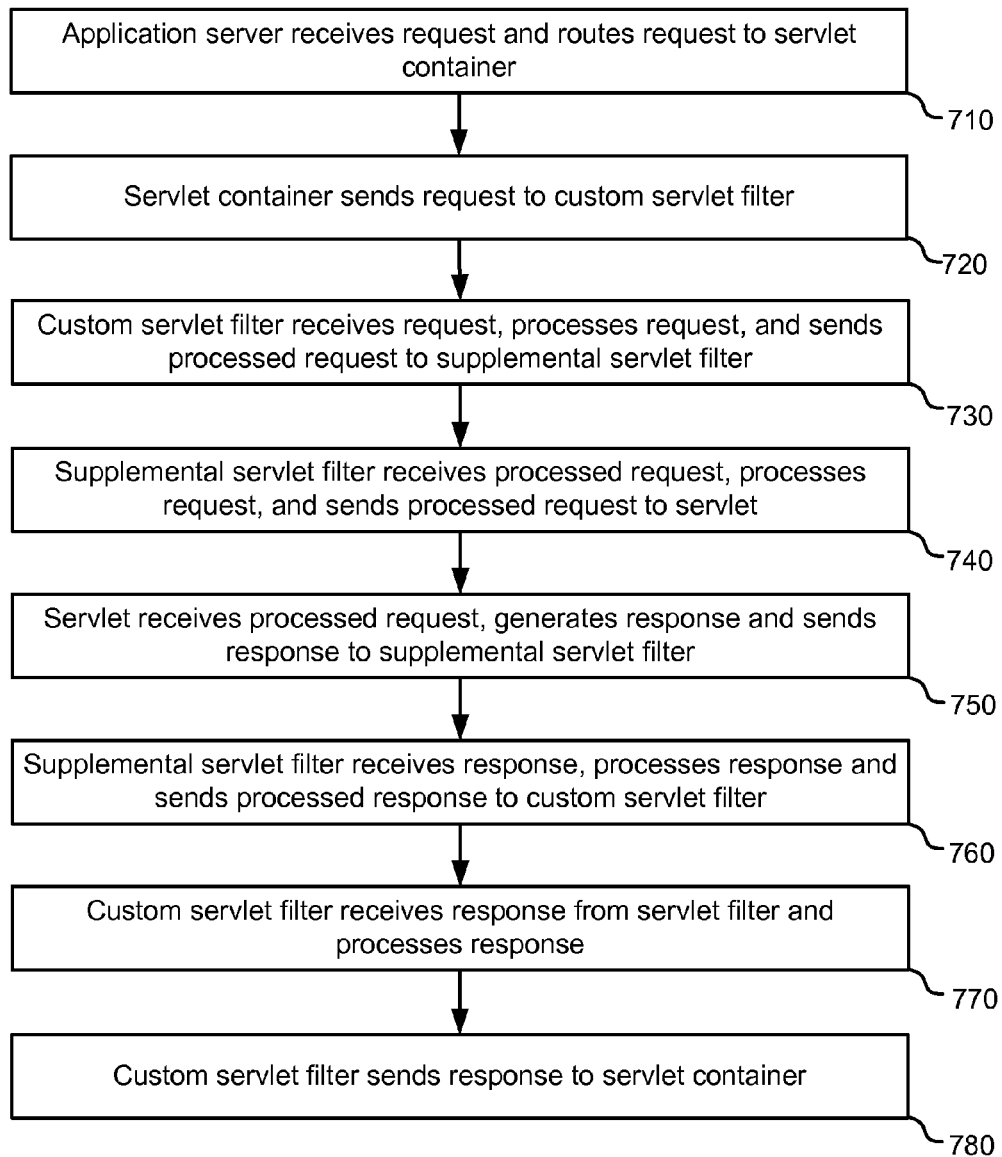
FIG. 7 illustrates a flowchart of an embodiment of a process for processing a content request by an application server.

FIG. 7 illustrates a flowchart of an embodiment of a method for processing a content request by an application server. The flowchart of FIG. 7 provides more detail for step 1410 of the flowchart of FIG. 13. The flowchart of FIG. 7 begins with application server 130 receiving a request and routing the request to servlet container 161 at step 710. Next, servlet container 161 sends the request to custom servlet filter 162 at step 720. Before sending the request, servlet container 161 determines the appropriate servlet to process the response. In one embodiment, servlet container 161 maintains templates for URLs that determine the chain of servlet filters and servlets to route requests to. To send the request, servlet container 161 calls custom servlet filter 162 with a request object and response object. The response object may be in the form of a response template generated by servlet container 161.

Next, custom servlet filter 162 receives the request from servlet container 161, processes the request and sends the processed request to supplemental servlet filter 163 at step 730. In one embodiment, processing of the request by custom servlet filter 162 includes assigning a unique identification number to the request. The request unique identification number and servlet identification information used to process the request is stored in servlet identification table 131. In another embodiment, custom servlet filter 162 may wrap the response object in a wrapper. The response object wrapper may be used to detect communications made to and from the response. For example, the wrapper may detect what mechanism is used to generate the body of the response and subsequently provide that information to a requesting entity. This is discussed in more detail below with respect to FIG. 8.

Supplemental servlet filter 163 receives the content request from custom servlet filter 162, processes the request if needed, and sends the content request to servlet 164 at step 740. Supplemental servlet filter 163 can perform any needed action to the response object before providing the response to servlet 164. For example, supplemental servlet filter 163 may be used to change an image within the request from one format to another format within the response.

Servlet 164 receives the content request from supplemental servlet filter 163, generates a content response, and sends the response to supplemental servlet filter 163 at step 750. Servlet 164 may perform logic on the received request and generate the response object for transmission to client device 105. In generating the response, servlet 164 can access one or more databases, call methods, or perform other actions. In one embodiment, a response wrapper associated with the response may record the mechanism used by servlet 164 to generate the response. For example, the response may be generated using a writer method, an output stream or some other mechanism. In any case, the response wrapper will save the writing mechanism information. In another embodiment, servlet 164 may configure length information for the response. The length information may be saved to the response itself as a length tag. The length tag may specify the length or size of the response (for example, 200 bytes). This may be manipulated later if the response is amended to include performance monitoring code or other information code.

Supplemental servlet filter 163 receives the content response from servlet 164, processes the response if needed, and sends the content response to custom servlet filter 162 at step 760. Supplemental servlet filter 163 may process the response by including any needed action as discussed above with respect to step 740. Next, custom servlet filter 162 receives the response from supplemental servlet filter 163 and processes the response at step 770. In one embodiment, custom servlet filter 162 adds performance monitoring code to the response. The performance monitoring code may be JavaScript or some other type of code that is able to generate benchmark response time data. Adding performance monitoring code to the content response is discussed in more detail below with respect to FIG. 8. After processing the content response, custom servlet filter 162 transmits the response to servlet container 161 at step 780. The response is now ready to be sent back to browser application 110 at client device 105 by application server 130.

Figure 8:
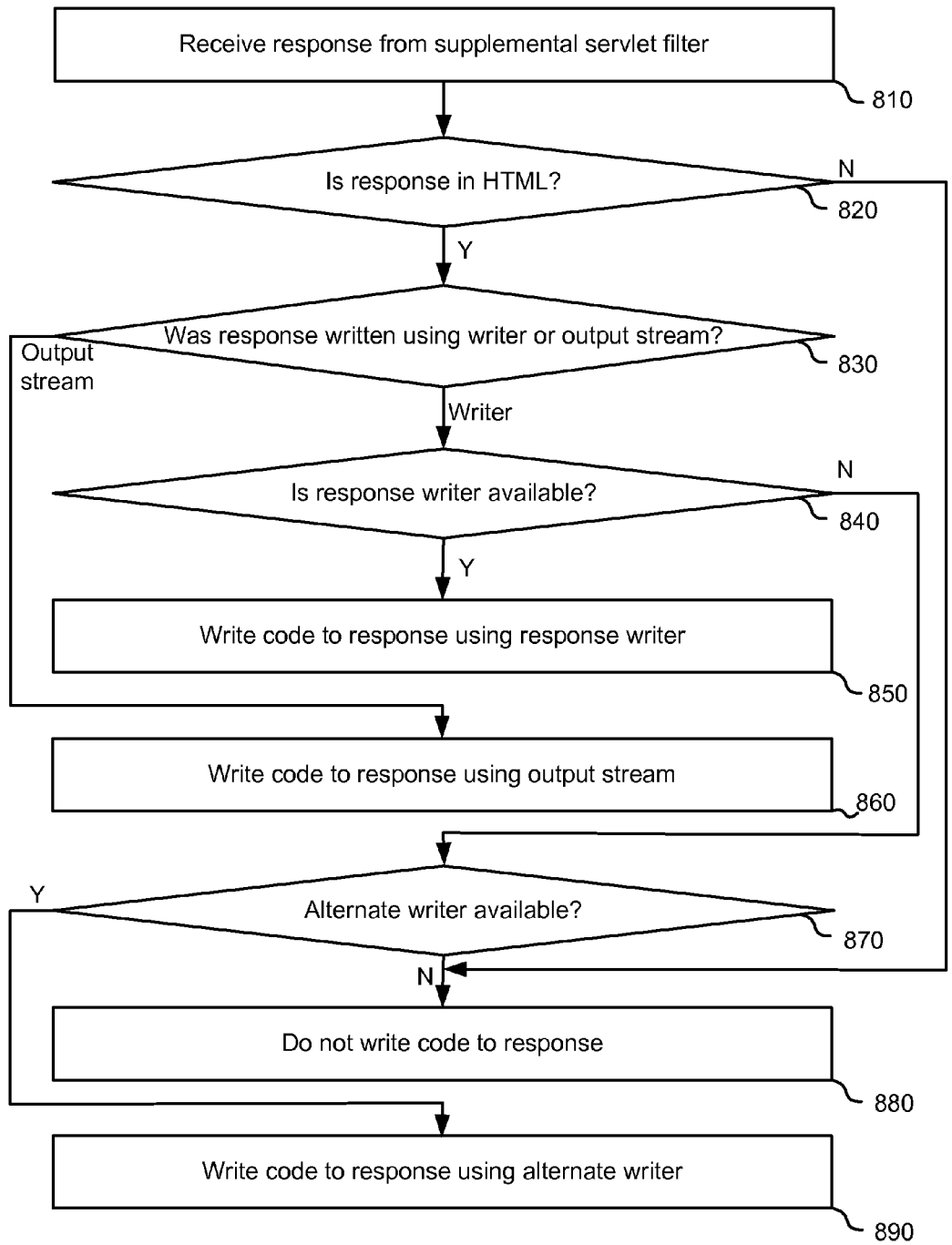
FIG. 8 illustrates a flowchart of an embodiment of a process for processing a response by a custom servlet filter.

FIG. 8 illustrates a flow chart of an embodiment of a method for processing a content response by custom servlet filter 162. In one embodiment, FIG. 8 illustrates more detail of step 770 of FIG. 7. First, a content response is received by custom servlet filter 162 from supplemental servlet filter 163 at step 810. Next, a determination is made as to whether the received response is in HTML at step 820. In one embodiment, the determination is made by querying the response object. The query may comprise of a call to a method for retrieving a Multi-Purpose Internet Mail Extension (MIME) type of the response object comprising the response. For example, the method may be a "get MIME type" method. The method call will retrieve the MIME type associated with the response. The response from the get MIME type method should indicate whether the MIME type is HTML or some other format. Custom servlet filter 162 may analyze the response from the method to determine whether the content response is in HTML format or not. If the response is determined to be HTML, operation continues to step 830. If the response is determined to not be in HTML, then operation continues to step 880. In one embodiment, in addition to determining the MIME type of the received content response, a portion of the response object may be parsed to confirm it has a particular format. For example, a header portion of the response may be parsed to determine if it is in HTML format.

A determination is made as to whether the content response was written using a writer method or output stream at step 830. In one embodiment, a Get Writer query can be made to the response object comprising the response. A response object wrapper having information associated with how the response was generated may intercept and reply to the Get Writer query. In one embodiment, the response object wrapper may record the mechanism used by servlet 164 to generate the object at step 750 of the flowchart of FIG. 7. If it is determined that the response was written using a writer method, operation continues to step 840. If it is determined that the response was written using an output stream, operation continues from step 830 to step 860.

If a writer method was used to generate the response, a determination is made as to whether the particular response writer object used to generate the content response is available at step 840. In this case, the response writer object used to generate the content response is needed to add additional content to the content response (for example, performance monitoring code). In one embodiment, the response writer object may not be available if it is closed or currently in use. Custom servlet filter 162 can call the desired response writer to determine whether it is available or not. In this case, the writer will send a response indicating whether it is closed or unavailable. If the response writer is determined to be available at step 840, operation continues to step 850. If the writer method is not available, operation continues to step 870.

If the writer method used to generate the response is determined to be available at step 840, JavaScript or some other appropriate type of code is written to the response using the available response writer at step 850. The performance monitoring code written to the response may include response identification data, code used to transmit time data back to application server 130 from client device 105, and code used to store, access and configure data files, browser cookies or other files at browser application 110. In another embodiment, in addition to writing the code to the response, the response writer may be used to change the response length data. In one embodiment, the response generated by servlet 164 includes data indicating the length or size of the response. The response length can be changed to reflect the addition of the performance monitoring code. In this case, the writer is used to change the length tag to reflect the length of the response which includes the performance monitoring code.

If a determination is made at step 830 that the response was written using an output stream, then the performance monitoring code is written to the response using an output stream at step 860. The code written using an output stream may be similar to that written using a response writer at step 850. The flowchart of FIG. 8 then ends at step 860.

If a determination is made at step 840 that the response writer is not available, a determination is then made as to whether an alternate writer is available at step 870. The alternate writer may be provided by custom servlet filter 162 or some other source. If no alternate writer is available, operation continues to step 880. If an alternate writer is available, operation continues to step 890. At step 880, no performance monitoring code is written to the response and operation of the flowchart ends. At step 890, performance monitoring code is written to the response using the alternate writer. The code written to the response using the alternate writer at step 890 is similar to the performance monitoring code using original response writer at step 850. The flowchart of FIG. 8 then ends at step 890.

Figure 9:
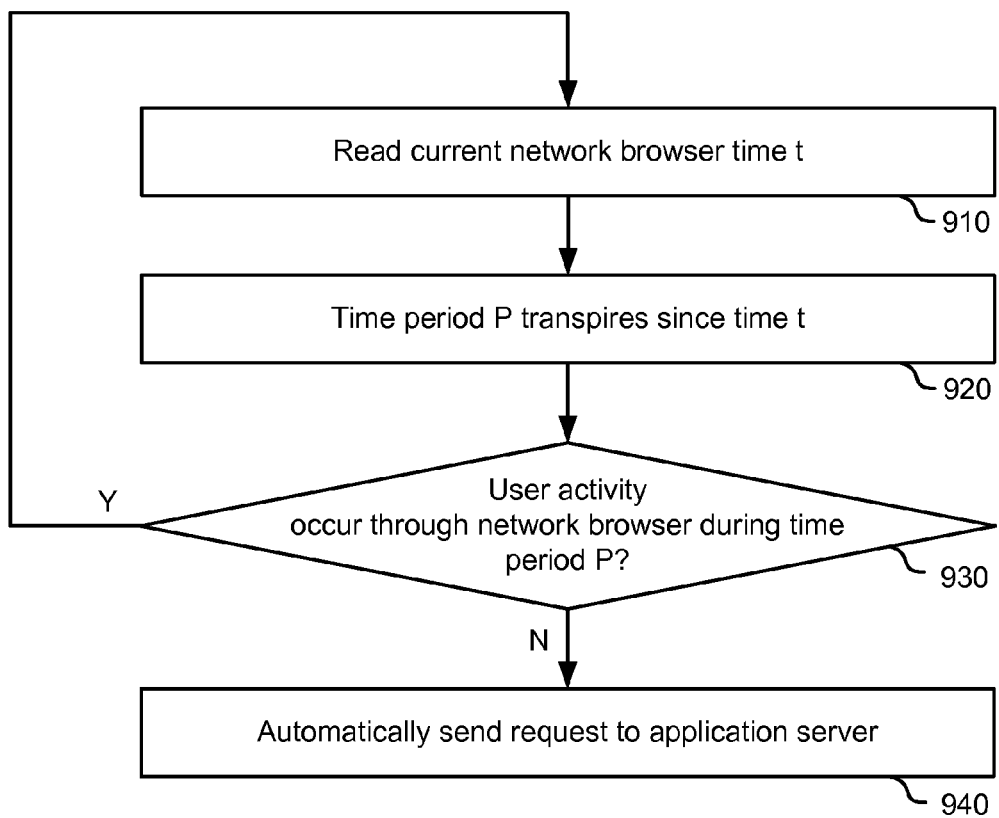
FIG. 9 illustrates a flowchart of an embodiment of a process for automatically sending a request to a network server.

FIG. 9 illustrates a flow chart of an embodiment of a method for automatically sending a request to a network server. In some embodiments, the process of FIG. 9 provides more details for step 520 of the process at FIG. 5. First, a current network browser time t is read at step 910. The network browser time t may be read by requesting the time from browser application 110 by the performance monitoring code. Next, a time period P transpires since the time t at step 920. The time period that transpires may be one second, five seconds, one minute or any other period of time. In some embodiments, the performance monitoring code may register with an event handler to trigger an event after the time period has expired.

Next, a determination is made by the performance monitoring code if user activity has occurred through the browser application 110 during the time period P at step 930. This determination determines whether or not input is received to browser application between a time t and a time t+P. Input into browser application 110 may be detected by monitoring browser event handlers associated with network requests. If user activity is detected during the time period p, the process of FIG. 9 returns to step 910. In this case, it is determined that a user is active at browser application 110 and user requests. If user activity is not detected during the period P, a request is automatically sent to application server 130 by browser application 110 at step 940.

In some embodiments, browser application 110 may generate M bytes of random data and include the M random bytes of data in the request automatically sent to application server 130. The M random bytes of data may be any size, such as 20 bytes, 100 bytes, or some other size. A response received by browser application 110 from application server 130 in response to the request should then contain the M random bytes of data generated by the browser application. Receiving the response from application sever 130 with the M random bytes of data may confirm that the data completed the round trip to and from application server 130.

Figure 10:
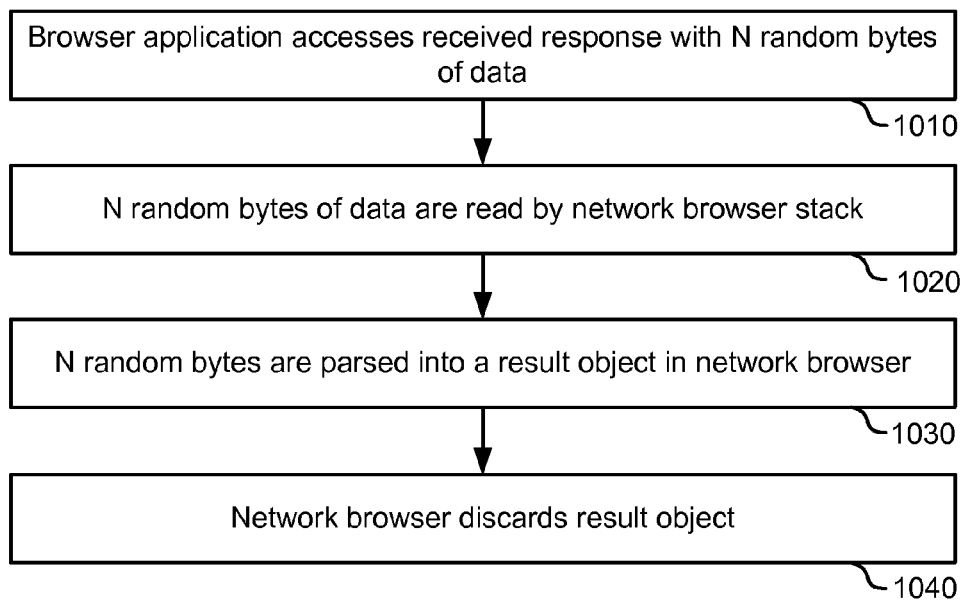
FIG. 10 illustrates a flowchart of an embodiment of a process for processing a response to a benchmark request.

FIG. 10 illustrates a flow chart of an embodiment of a process for processing a response to a benchmark request. In some embodiments, the process of FIG. 10 provides more detail for step 550 of the process of FIG. 5. First, browser application 110 accesses a received response with N random bytes of data at step 1010. Next, the N random bytes of data are read by a network browser stack of browser application 110 at step 1020. The data bytes are retrieved from the response and loaded into the browser stack by browser application 110.

The accessed N random bytes of data can be processed in some manner to simulate processing of a response for a user-initiated content request. In some embodiments, the N random bytes are processed by parsing the bytes into a result object in browser application 110 at step 1030. The bytes may be parsed by size or based on some other feature. In some embodiments, the bytes contained in the response may be processed in some other manner.

In some embodiments, the response may also include the M random bytes of data generated by browser application 110 and included in a request to application server 130. The response may be parsed to determine if the M random bytes are contained in the response. In some embodiments, the M random bytes may be at a known location of the response, such as the start of the response data or the end of the response data. When the response is expected to contain M random bytes, the response time data reported to application server 110 may include an indication, such as a flag or other indication, as to whether or not the response contained the expected M random bytes. Browser application 110 discards the results object generated at step 1030 at step 1040. As discussed above, browser application 110 processes the response but does not change the display provided through browser application 110 to a user.

Figure 11:
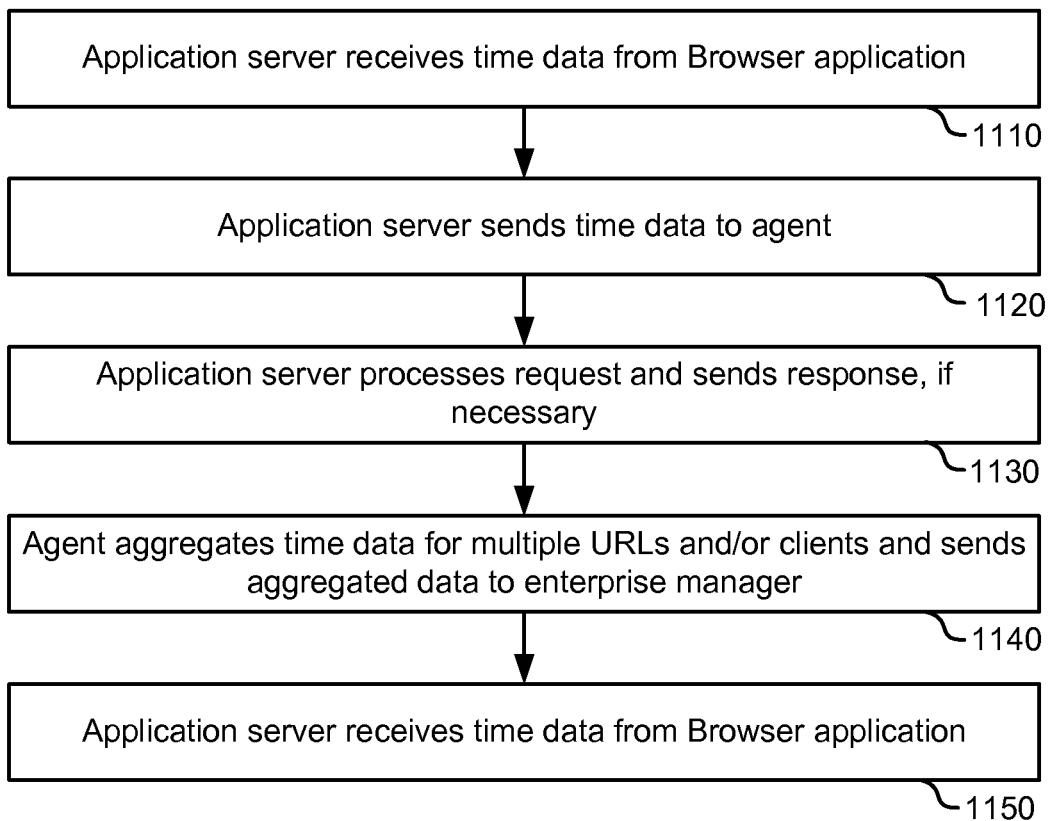
FIG. 11 illustrates a flowchart of an embodiment of a process for processing response time data by an application server.

FIG. 11 is an illustration of a flow chart of an embodiment of a method for receiving and processing response time data by application server 130. In some embodiments, the method of FIG. 11 provides more detail of step 580 at FIG. 5. First, application server 130 receives response time data from browser application 110 at step 1110. Next, application server 130 sends the response time data to Agent 208 at step 1120. After sending the response time data to agent 208, application server 130 may process any request and send a response if necessary at step 1130. For example, if the time data was sent to application server 130 as part of an automatic benchmark request, another N bytes are randomly generated, placed in a response and sent to browser application 110. If the response time data was sent as part of a user-initiated request, the request is processed as usual by application server 130. Agent 208 aggregates time data and sends the aggregated data to Enterprise Manager 220 at step 1140. The data may be aggregated by client, URL requested, or in some other manner. Next, Enterprise Manager 220 provides the aggregated data or other data derived from the aggregated data to a user through one of Work Stations 226-224. In some embodiments, Enterprise Manager 220 may store the aggregated data at Database 222 or at some other location.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A machine implemented method for determining performance of a server, comprising:
sending a first content request from a client to a first server, the first content request is user-initiated;
receiving performance monitoring code and first content data by the client in a first response to the first content request;
processing the first content data, the processing comprising presenting the first content data in a user interface at the client;
automatically sending a second content request to the first server by the client, the performance monitoring code initiating the sending of the second content request in response to determining that a browser application on the client is idle;
recording a first time at the client associated with sending the second content request;
receiving a second response to the second content request from the first server, the second response comprising a predetermined number of random bytes of data;
processing the random bytes of data contained in the second response by the client without modifying content presented in the user interface as a result of processing the random bytes of data contained in the second response;
recording a second time at the client after the client has processed the second response; and
reporting the first time and the second time by the client, the performance monitoring code initiates said recording the first time, recording the second time and reporting the first time and the second time.

2. The method of claim 1, further comprising receiving a network page by the client, the network page comprising the performance monitoring code.

3. The method of claim 1, wherein the performance monitoring code is script code.

4. The method of claim 1, said sending a second content request comprises:
executing the performance monitoring code; and
sending the second request by the browser application.

5. The method of claim 1, wherein said recording a first time comprises:
storing the first time by the browser application at the client.

6. The method of claim 1, wherein said user interface is the browser application on the client.

7. The method of claim 1, wherein said reporting comprises:
reporting the first time and the second time in an image request to the first server.

8. The method of claim 1, wherein said reporting comprise:
automatically sending a third request to the first server by the client; and
including the first time and the second time in the third request.

9. The method of claim 1, wherein said reporting comprises:
receiving input from a user by the browser application; and
sending a third request to the first server in response to said receiving input by the browser application, the third request comprising the first time and the second time.

10. The method of claim 1, wherein said processing comprises simulating processing of a response for a user-initiated content request.

11. One or more processor readable storage devices comprising processor readable code embodied on said processor readable storage devices, said processor readable code for programming one or more processors to:
send a first content request from a client to a server, the first content request is user-initiated;
receive performance monitoring code and first content data from the server by the client in a first response to the first request;
process the first content data, the processing comprises presenting the first content data in a user interface at the client;
automatically send a second request to the server by the client, the performance monitoring code initiating the sending of the second request;
receive a second response from the server by the client, the second response containing a first number of random bytes, the second request and second response are a second request/response pair;
process the first number of random bytes in the second response without modifying content presented in the user interface as a result of processing the data contained in the second response;
automatically send a third request to the server by the client, the performance monitoring code initiating the sending of the third request in response to determining that a browser application is in an idle state;
receive a third response from the server by the client, the third response containing the first number of random bytes, the third request and third response are a third request/response pair;
process the first number of random bytes in the third response without modifying content presented in the user interface as a result of processing the data contained in the third response; and
automatically report time information associated with the second and third request/response pairs to a performance monitoring system.

12. The one or more processor readable storage devices of claim 11, wherein the performance monitoring code is loaded into the browser application on the client.

13. The one or more processor readable storage devices of claim 11, wherein the third request comprises:
response time data associated with the second request.

14. The one or more processor readable storage devices of claim 13, wherein the response time data comprises the time the second request was sent and the time processing the first number of random bytes in second response is completed.

15. An apparatus for processing data, comprising:
a communication interface;
a storage device; and
one or more processors in communication with said storage device and said communication interface, said one or more processors send a first content request to a server, the first content request is user-initiated,
said one or more processors receive performance monitoring code and first content data from the server in a first response to the first request,
said one or more processors present the first content data in a user interface,
said performance monitoring code causes said one or more processors to automatically send a second request to the server when a browser application is idle,
said performance monitoring code causes said one or more processors to store a first time associated with sending the second request,
said one or more processors receive a second response from the server, the second response comprising a first number of randomly generated bytes of data,
said performance monitoring code causes said one or more processors to process the random bytes of data contained in the said response without modifying content presented in said user interface as a result of processing the random bytes of data contained in the second response,
said performance monitoring code causes said one or more processors to store a second time after the random bytes of data are processed, and
said performance monitoring code causes said one or more processors to report the first time and the second time to said server.

16. A method for determining performance, comprising:
receiving a network page by a browser application on a client, the network page comprising performance monitoring code and first content data;
processing the first content data, the processing comprises presenting the first content data by the browser application;
automatically sending a request to a server by the browser application, the request sent in response to executing the performance monitoring code by the browser application, comprising determining the browser application is idle as a condition for initiating the sending of the request;
storing a first time at which the request was sent to the server;
receiving a response from the server by the browser application, the response comprising a predetermined number of bytes of random data;
processing the random data contained in the response by the browser application, wherein said step of processing does not include changing content displayed to a user by the browser application;
storing a second time at which the browser application has processed the response; and
transmitting the first time and second time by the client.

17. The method of claim 16, wherein said step of processing the random data comprises:
parsing the random data.

18. The method of claim 16, wherein said first time and second time are stored in a text file on the client.

19. The method of claim 16, wherein said step of transmitting the first time and second time comprises:
transmitting the first time and the second time by the client to the server.

20. The method of claim 16, wherein said step of transmitting the first time and second time comprises:
sending a content request to the server in response to user input; and
transmitting the first time and the second time within the content request.

21. The method of claim 16, wherein said processing is performed to simulate processing of a response for a user-initiated content request.

22. The method of claim 16, wherein said processing comprises:
parsing the predetermined number of bytes of random data into a result object; and
discarding the result object without changing the content displayed by the browser application.

23. One or more processor readable storage devices comprising processor readable code embodied on said processor readable storage devices, said processor readable code for programming one or more processors to:
automatically initiate a request to a server by a client in response to determining that a browser application is idle, said code for programming the one or more processors to initiate a request for programming the one or more processors to:
generate random bytes of data at the client; and
include the random bytes of data in the request;
store a first time associated with the request;
access a response from the server, the response comprising the random bytes of data;
process the random bytes of data contained in the response by the browser application, said code for programming the one or more processors to process the random bytes of data comprises code for programming the one or more processors to determine whether the random bytes of data are included in the response, said code for programming the one or more processors to process the random bytes of data for programming the one or more processors to simulate processing of a response for a user-initiated content request to the server, the simulating comprising parsing the random bytes into a result object and discarding the result object without changing the content displayed by the browser application;
store a second time at which the browser application has processed the response; and
transmit time data associated with the first time and second time.

24. The one or more processor readable storage devices of claim 23, wherein the time data indicates whether the response included the random bytes of data.

25. The one or more processor readable storage devices of claim 23, wherein the time data comprises the first time and the second time.

* * * * *

UNITED STATES PATENT AND TRADEMARK OFFICE
CERTIFICATE OF CORRECTION

| | | |
|---|---|---|
| PATENT NO. | : 8,849,981 B2 | Page 1 of 1 |
| APPLICATION NO. | : 11/566684 | |
| DATED | : September 30, 2014 | |
| INVENTOR(S) | : Zuzga et al. | |

It is certified that error appears in the above-identified patent and that said Letters Patent is hereby corrected as shown below:

In the Claims

Col. 20, line 5, claim 8: After "reporting" and before ";", delete "comprise" and insert -- comprises --

Col. 21, line 43, claim 16: "After "application," and before "determining", delete "comprisine" and insert -- comprising --

Signed and Sealed this
Second Day of June, 2015

Michelle K. Lee
*Director of the United States Patent and Trademark Office*